US012790953B2

(12) United States Patent
Greuet et al.

(10) Patent No.: US 12,790,953 B2
(45) Date of Patent: Nov. 10, 2026

(54) MOVABLE RING ASSEMBLY FOR A TURBOMACHINE ROTOR

(71) Applicant: SAFRAN AIRCRAFT ENGINES, Paris (FR)

(72) Inventors: Damien Greuet, Moissy Cramayel (FR); Eric Favereau, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/695,151

(22) PCT Filed: Oct. 11, 2022

(86) PCT No.: PCT/FR2022/051912
§ 371 (c)(1),
(2) Date: Mar. 25, 2024

(87) PCT Pub. No.: WO2023/062314
PCT Pub. Date: Apr. 20, 2023

(65) Prior Publication Data

US 2025/0122808 A1 Apr. 17, 2025

(30) Foreign Application Priority Data

Oct. 13, 2021 (FR) ....................................... 2110834

(51) Int. Cl.
*F01D 11/00* (2006.01)
*F01D 5/30* (2006.01)

(52) U.S. Cl.
CPC .......... *F01D 11/006* (2013.01); *F01D 5/3015* (2013.01); *F01D 5/3092* (2013.01); *F05D 2300/132* (2013.01); *F05D 2300/611* (2013.01)

(58) Field of Classification Search
CPC ...... F01D 5/005; F01D 5/3007; F01D 5/3015; F01D 5/3092; F01D 11/001;
(Continued)

(56) References Cited

U.S. PATENT DOCUMENTS 4,480,958 A * 11/1984 Schlechtweg ........... F01D 5/326
416/220 R
4,730,983 A * 3/1988 Naudet ................. F01D 5/3015
416/221

(Continued)

FOREIGN PATENT DOCUMENTS

| | | |
|---|---|---|
| EP | 1849962 A1 | 10/2007 |
| EP | 3667015 A1 | 6/2020 |
| WO | 2015197980 A1 | 12/2015 |

OTHER PUBLICATIONS

International Patent Application No. PCT/FR2022/051912, International Search Report and Written Opinion dated Jan. 17, 2023, 14 pages (12 pages of original document and 2 pages of English translation).

*Primary Examiner* — Courtney D Heinle
(74) *Attorney, Agent, or Firm* — Kilpatrick Townsend & Stockton LLP

(57) ABSTRACT

Movable ring assembly for a turbomachine rotor, the movable ring including an outer peripheral toothing, each tooth of the outer peripheral toothing having an inner face intended to be positioned facing a blade root of the rotor, and an outer face opposite to the inner face and intended to be positioned facing an axial retaining hook arranged on the blade root. Furthermore, the movable ring assembly includes at least one protective element arranged on the outer face of at least one tooth of the outer peripheral toothing.

6 Claims, 4 Drawing Sheets

(58) Field of Classification Search
CPC .. F01D 11/005; F01D 11/006; F05D 2230/80; F05D 2260/33
See application file for complete search history.

(56) References Cited

U.S. PATENT DOCUMENTS

| | | | | |
|---|---|---|---|---|
| 5,257,909 | A * | 11/1993 | Glynn | F01D 11/006 416/220 R |
| 8,419,361 | B2 * | 4/2013 | Robertson | F01D 9/042 415/209.2 |
| 2007/0020089 | A1 | 1/2007 | Forgue et al. | |
| 2017/0306791 | A1 * | 10/2017 | Biolsi | F01D 9/042 |
| 2018/0058235 | A1 * | 3/2018 | Jones | F01D 25/246 |

* cited by examiner

MOVABLE RING ASSEMBLY FOR A TURBOMACHINE ROTOR

TECHNICAL FIELD

The present invention relates, generally, to a turbomachine rotor and relates, more particularly, to maintaining a plurality of blades in a turbine disk by a movable ring of a turbomachine rotor.

More specifically, the invention relates to a movable ring assembly as well as a turbomachine rotor comprising such a movable ring assembly.

PRIOR ART

Conventionally, a turbomachine comprises from upstream to downstream with respect to the direction of air circulation in the turbomachine, a fan, a low pressure compressor stage, a high pressure compressor stage, a combustion chamber, a high pressure turbine stage and a low pressure turbine stage.

With reference to FIG. 1, a low pressure turbine stage generally comprises a rotor disk 1 on which a plurality of removable blades 2 are mounted. The blades 2 comprise a blade root 3 machined at the base of the blade 2 and having a portion, for example which is dovetail-shaped, for their installation in axial channels, which are also dovetail-shaped, machined on the rotor disk 1. The assembly is carried out by fitting the blade root 3 into the axial channel.

The blade roots 3 are immobilised axially by means of hooks 4 for axially retaining the blade on the rotor disk 1, integral with the blade roots 3.

The ring arm 5 of a movable ring 6 is provided with outer peripheral toothing 7. The movable ring 6 is mounted on the rotor disk 1 and the blades 2 so that the teeth of the outer peripheral toothing 7 are inserted into the groove 8 of the axial retaining hooks 4. Each blade 2 has an axial retaining hook 4 and the teeth of the outer peripheral toothing 7 of the movable ring block each blade 2 via the groove 8.

A seal 9, arranged between the movable ring 6 and the rotor disk 1, limits air leaks.

The shape of the ring arm 5 is permissive in terms of bending leading to the movement of the ring arm 5 when hot. The blade 2 is generally made of a harder material than that of the movable ring 6 and the movement of the ring arm causes repeated contacts with the axial retaining hook.

These impacts, which are added to the shocks due to vibrations during the flight phases, lead to deterioration by contact wear, or "fretting", of the groove of the axial retaining hooks 4 and of the outer peripheral toothing 7. The deformation causes deterioration by impression of the teeth up to a loss of thickness of 2 mm.

DESCRIPTION OF THE INVENTION

The invention therefore aims at overcoming these disadvantages and proposing a turbomachine rotor allowing to reduce or even eliminate premature wear of the movable ring by limiting the contact between the movable ring and the axial retaining hook.

A movable ring assembly for a turbomachine rotor is therefore proposed, the movable ring comprising outer peripheral toothing, each tooth of the outer peripheral toothing having an inner face intended to be positioned facing a blade root of the rotor and an outer face opposite to the inner face and intended to be positioned facing an axial retaining hook arranged on the blade root.

Furthermore, the movable ring assembly comprises at least one protective element arranged on the outer face of at least one tooth of the outer peripheral toothing.

According to an exemplary embodiment, the protective element can be a coating on the outer face of the teeth.

According to one feature, the material of said coating may have nickel and chromium.

Advantageously, the outer face of the teeth may comprise a machined portion to which said coating is applied.

According to another exemplary embodiment, the protective element can be a protective part arranged on the movable ring.

Advantageously, the movable ring assembly may comprise a plurality of protective parts, each protective part being positioned on one of the teeth of the outer peripheral toothing.

According to a variant, the protective part can extend over the entire circumference of the outer peripheral toothing of the movable ring, the protective part having a slot. The slot is made to allow the mounting of the protective part on the outer peripheral toothing of the movable ring.

Advantageously, the outer peripheral toothing can be surmounted by the protective part, the protective part comprising a first portion configured to cover the outer and inner faces of the teeth of the outer peripheral toothing.

Advantageously, the movable ring may comprise a hook arranged in the extension of the inner face of the teeth of the outer peripheral toothing and configured to receive a seal, a second portion of the protective part having a hook configured to be integrated at least partly into the hook arranged on the movable ring.

Preferably, the hook of the second portion of the protective part has an oblique section configured to receive a seal and extending in a direction opposite to the central axis of the movable ring.

The invention also relates to a turbomachine rotor comprising a plurality of blades each having a blade root provided with an axial retaining hook.

Furthermore, the rotor further comprises a movable ring assembly as described previously, the inner and outer faces of each tooth of the outer peripheral toothing of the movable ring being respectively positioned facing a blade root and facing an axial retaining hook.

The invention also relates to a turbomachine comprising a rotor as described above.

BRIEF DESCRIPTION OF THE DRAWINGS

Other purposes, advantages and features will emerge from the description which follows, given for purely illustrative purposes and made with reference to the appended drawings wherein.

DETAILED DESCRIPTION OF AN EMBODIMENT

Figure 2:
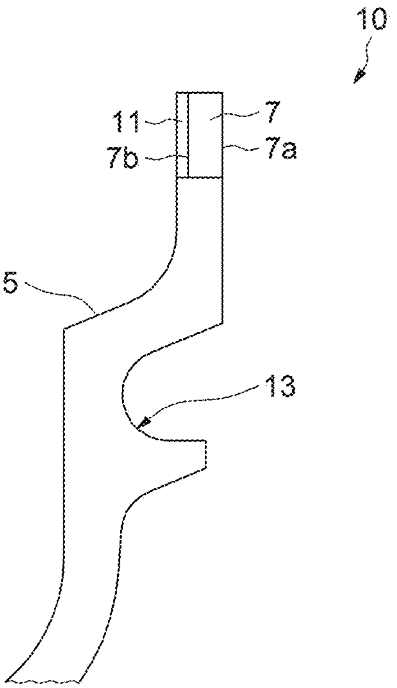
FIG. 2 is a sectional view of a movable ring arm of a movable ring assembly for a turbomachine rotor according to a first embodiment of the invention.
Figure 3:
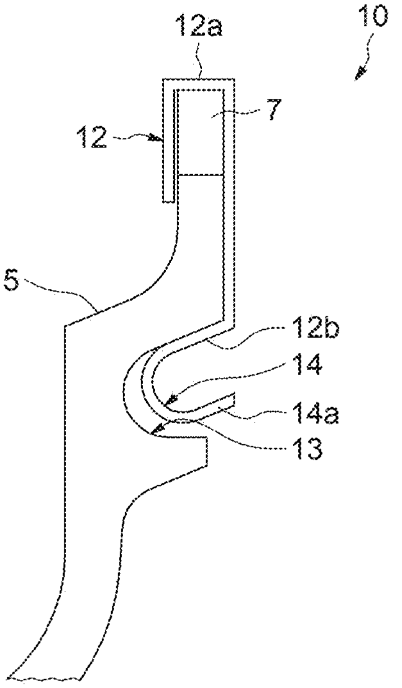
FIG. 3 is a view of a movable ring arm of a movable ring assembly for a turbomachine rotor according to a second embodiment of the invention.

FIGS. 2 and 3 illustrate a low pressure turbine stage of an aircraft turbomachine.

Figure 1:
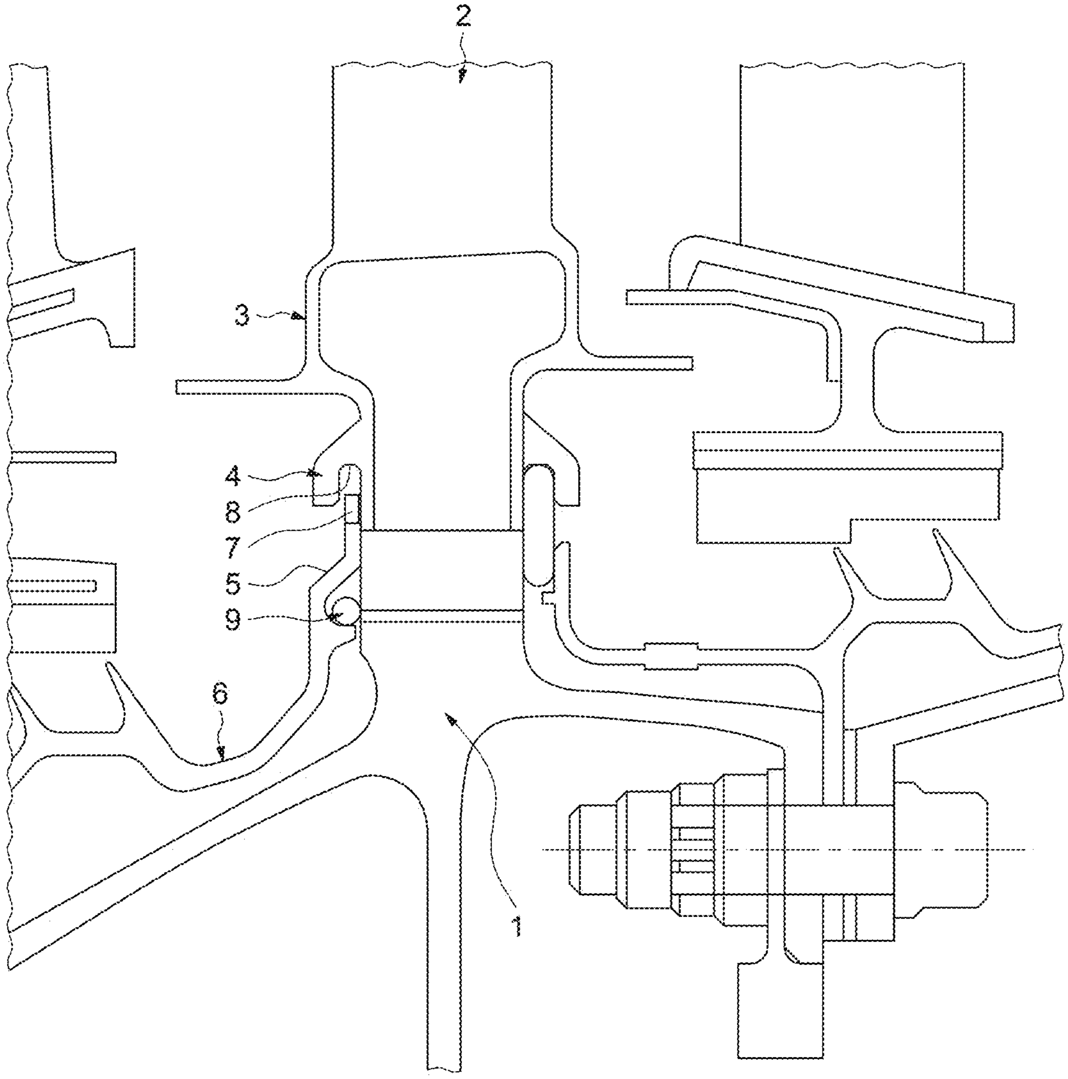
FIG.1 PRIOR ART
FIG. 1 is a sectional view of a turbomachine rotor according to the prior art.

The references relating to the elements of the low pressure turbine rotor illustrated in FIGS. 2 and 3 of identical structure or function, equivalent or similar to those of the elements of the low pressure turbine rotor illustrated in FIG. 1 are identical.

The rotor of the illustrated low pressure turbine stage comprises a rotor disk 1 on which is mounted a plurality of removable blades 2. The blades 2 comprise a blade root 3 machined at the base of the blade 2 and having a portion, which is for example dovetail-shaped, for their installation in axial channels, which are also dovetail-shaped, machined on the rotor disk 1. The assembly is carried out by fitting the blade root 3 into the axial channel.

The blade roots 3 are immobilised axially by means of hooks 4 for axially retaining the blade on the rotor disk 1, integral with the blade roots 3.

The movable ring 6, and in particular the free end of the movable ring 6, otherwise called ring arm 5 of the movable ring 6, is provided with outer peripheral toothing 7. The outer peripheral toothing 7 is formed by a plurality of teeth or claws. The movable ring 6 is mounted on the rotor disk 1 and the blades 2 so that each tooth of the outer peripheral toothing 7 is associated with a blade root 3 and is inserted into a groove 8 of an axial retaining hook 4 arranged on the blade root 3.

The teeth of the outer peripheral toothing 7 have an inner face 7*a* and an outer face 7*b* facing the inner face 7*a*. The inner face 7*a* is intended to be positioned facing a blade root 3 of the rotor and the outer face 7*b* intended to be positioned facing the axial retaining hook 4 arranged on the blade root 3.

The plurality of blades 2 is thus arranged on the outer peripheral toothing 7 of the movable ring 6 and each of the teeth of the outer peripheral toothing 7 of the movable ring 6 is positioned facing a groove 8 of an axial retaining hook 4 of the blade root 3.

In the example illustrated, a seal 9, also called a seal, is arranged between the movable ring 6 and the rotor disk 1.

After the blades 2 and the seal 9 are positioned on the rotor disk 1, the movable ring 6 is rotated a few degrees to place each of the teeth in one of the grooves 8 of the axial retaining hook 4.

The outer peripheral toothing 7 allows to maintain the movable ring 6 upstream of the blades 2 in place during mounting but also to avoid disengagement of the seal 9 upstream of the blades 2 during operation of the turbomachine.

The interaction between the axial retaining hooks 4 and the movable ring 6 is therefore obtained thanks to the presence of the claws formed by the outer peripheral toothing 7. During assembly, the movable ring 6 is inserted by passing the axial retaining hooks 4 between the teeth of the outer peripheral toothing 7, then by slightly rotating the movable ring 6 until the teeth are arranged in a final position wherein each tooth is positioned in a groove 8 of an axial retaining hook 4.

The axial retaining hooks 4 limit the centrifugal opening of the ring arm 5. During operation of the turbomachine rotor, the high temperature induces the movement of the movable ring 6 which opens and contacts the axial retaining hook 4 repeatedly causing contact wear of the teeth of the outer peripheral toothing 7.

The presence of the claws complicates the geometry of the movable ring 6.

At least one protective element is arranged on the outer face of at least one tooth, preferably each of the teeth, of the outer peripheral toothing 7. The movable ring 6 and the protective element form a movable ring assembly 10.

The protective element, arranged on the outer face 7*b* of the teeth subject to contact with the axial retaining hook 4, thus limits the wear of the outer peripheral toothing 7 by adapting to the complex shape of the movable ring 6.

According to a first embodiment illustrated in FIG. 2, the protective element is a coating 11 applied to the outer face 7 of the teeth of the outer peripheral toothing 7 allowing to improve its mechanical properties in friction.

Advantageously, the material of the coating 11 has nickel and chromium in order to improve the resistance properties of the outer face 7*b* of the coated tooth against friction and limit its wear.

The deposition of the coating 11 has the advantage of protecting the movable ring 6 from friction without significantly modifying its mass.

In the example illustrated, the outer face 7*b* of the teeth comprises a machined portion to which the coating is applied. It is thus possible to control the final thickness of the teeth by controlling the residual thickness of the teeth after machining. The formation of a machined portion avoids creating extra thickness on the teeth after application of the coating.

Figure 4:
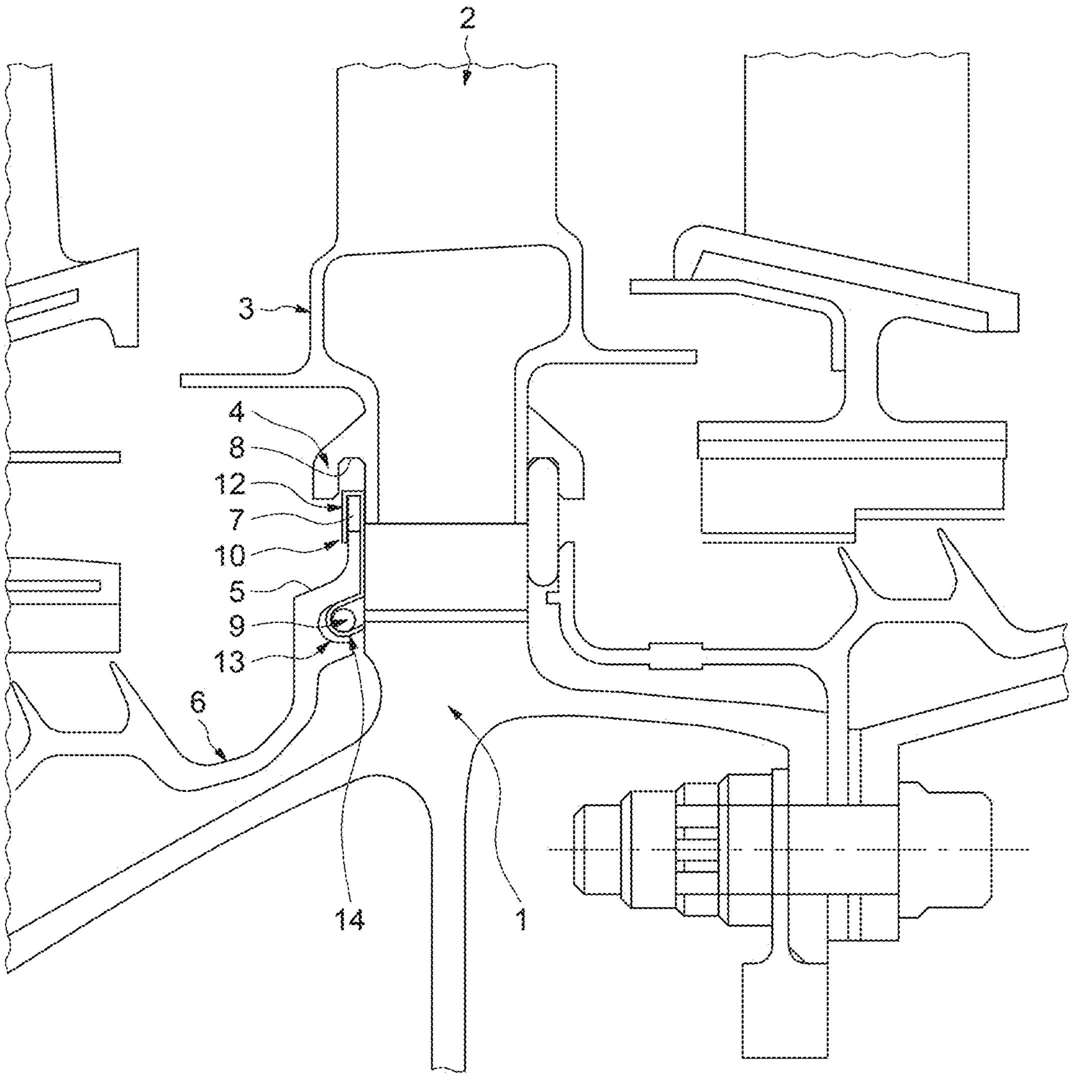
FIG. 4 is a sectional view of a turbomachine rotor comprising a movable ring assembly according to the second embodiment illustrated in FIG. 3.

According to a second embodiment illustrated in FIGS. 3 and 4, the protection element can be a protective part 12 arranged on the movable ring 6. The protective part 12 is arranged on the outer face 7*b* of the teeth of the outer peripheral toothing 7 and undergoes contact wear instead of the movable ring 6.

In the example illustrated, the protective part 12 is an independent part of the movable ring 6 facilitating the replacement of the protective part 12 when it is worn.

According to an alternative embodiment, it could be provided that the protective element is a protective part fixed on the movable ring 6.

The protective part 12 illustrated is a part of revolution and extends over the entire circumference of the outer peripheral toothing 7. In this way, the single protective part 12 protects all the teeth of the outer peripheral toothing 7.

Figure 5:
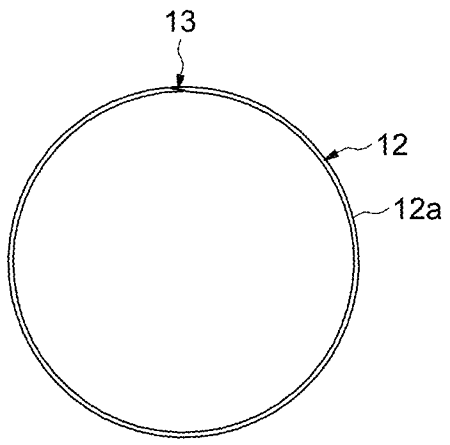
FIG. 5 is a top view of a protective part of a movable ring assembly according to the second embodiment illustrated in FIG. 3.
Figure 6:
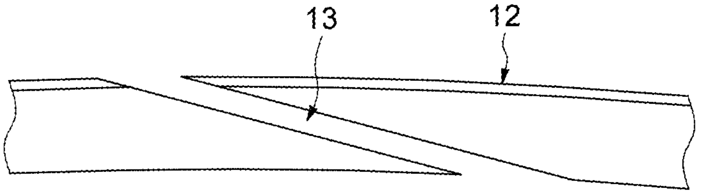
FIG. 6 is the detailed view of a slot of the protective part illustrated in FIG. 5.

As shown in FIG. 5, the protective part 12 preferably has a slot 13 on its circumference, which makes it easier to be mounted on the movable ring 6. The spacing of the two ends of the protective part 12 formed by the slot allows to increase its inner diameter to mount it on the movable ring 6. Once mounted, the protective part 12 returns to its equilibrium position by reducing its inner diameter and is positioned on the movable ring 6.

The protective part 12 can be produced by simple techniques such as folding or stamping.

Given the complex geometry of the movable ring 6, producing the protective part 12 by folding or stamping can prove to be difficult.

In this regard, according to an alternative embodiment, the movable ring 6 assembly 10 may comprise a plurality of protective parts, each protective part being positioned on one of the teeth of the outer peripheral toothing 7.

The protection of the entire outer peripheral toothing 7 is then obtained via all of these protective parts 12. Their production is simplified and their folding or stamping is more easily achievable.

In the exemplary embodiment illustrated in FIGS. 3 and 4, the outer peripheral toothing 7 is surmounted by the protective part 12. The protective part 12 comprises a first portion 12*a* configured to cover the outer 7*b* and inner 7*a* faces of the teeth of the outer peripheral toothing 7. The protective part 12 thus matches the shape of the outer peripheral toothing 7.

In addition, the movable ring 6 may comprise a hook 13 arranged in the extension of the inner face 7*a* of the teeth of the outer peripheral toothing 7, configured to receive the seal 9.

The protective part 12 can, advantageously, comprise a second portion 12*b* provided with a hook 14 configured to match the shape of the movable ring 6 and be integrated at least partly into the hook 13 arranged on the movable ring 6. The hook 14 of the protective part 12 then allows the integration of the seal 9.

Preferably, the protective part 12 has a retaining means for holding it on the outer peripheral toothing 7. The retaining means is, preferably, configured for blocking the protective part 12 in order to prevent its radial leakage under centrifugal force.

In this regard, in the example illustrated, the hook 14 of the protective part 12 also allows the blocking of the protective part 12 on the movable ring 6 to prevent its radial leakage by centrifugal force during the rotation of the movable ring 6.

In addition, the hook 14 of the second portion 12*b* of the protective part 12 preferably has an oblique section 14*a* for receiving the seal 9. The oblique section extends in a direction opposite to the axis of rotation of the movable ring 6, towards the blade roots 3.

In this way, the seal integrated into the hook 14 of the protective element 12 and resting on the oblique section 14 is encouraged to rise under the centrifugal effect to obstruct the axial clearance between the movable ring 6 and the rotor disk 1 created by the opening of the movable ring 6 when hot. This prevents ventilation air leaks in particular.

The invention claimed is:

1. A movable ring assembly for a turbomachine rotor, wherein the movable ring assembly comprises a movable ring with outer peripheral toothing, each tooth of the outer peripheral toothing having an inner face positionable facing a blade root of the rotor and an outer face opposite to the inner face and positionable facing an axial retaining hook arranged on the blade root, wherein the movable ring further comprises at least one protective element arranged on the outer face of at least one tooth of the outer peripheral toothing, wherein the protective element is a protective part arranged on the movable ring, wherein the outer peripheral toothing is surmounted by the protective part, and wherein the protective part comprises a first portion configured to cover the outer and inner faces of teeth of the outer peripheral toothing, and wherein the movable ring comprises a hook arranged in an extension of the inner face of the teeth of the outer peripheral toothing and configured to receive a seal, and wherein a second portion of the protective part comprises a hook configured to be integrated at least partly into the hook arranged on the movable ring.

2. The movable ring assembly according to claim 1, further comprising a plurality of protective parts, each protective part of the plurality of protective parts being positioned on a respective tooth of the teeth of the outer peripheral toothing.

3. The movable ring assembly according to claim 1, wherein the protective part extends over an entire circumference of the outer peripheral toothing of the movable ring, and wherein the protective part comprises a slot.

4. The movable ring assembly according to claim 1, wherein the hook of the second portion of the protective part comprises an oblique section for receiving the seal and extending in a direction opposite to an axis of rotation of the movable ring.

5. A turbomachine rotor comprising a plurality of blades each having a blade root provided with an axial retaining hook, wherein the turbomachine rotor further comprises the movable ring assembly according to claim 1, the inner and outer faces of each tooth of the outer peripheral toothing of the movable ring being respectively positioned facing a blade root and facing an axial retaining hook.

6. A turbomachine comprising the turbomachine rotor according to claim 5.

* * * * *